United States Patent

Amoroso, Jr.

[11] 3,931,575
[45] Jan. 6, 1976

[54] FILTER STABILIZED SINGLE OSCILLATOR TRANSCEIVERS

[75] Inventor: Salvatore Amoroso, Jr., Fairfield, Conn.

[73] Assignee: United Technologies Corporation, Hartford, Conn.

[22] Filed: Oct. 21, 1974

[21] Appl. No.: 516,536

[52] U.S. Cl. .................... 325/17; 325/18; 325/20; 325/21; 343/180
[51] Int. Cl.² ........................................... H04B 1/40
[58] Field of Search ........................ 325/17–25, 325/63; 343/179, 180, 181; 179/15 BM

[56] References Cited
UNITED STATES PATENTS

| | | | |
|---|---|---|---|
| 2,958,768 | 11/1960 | Brauer | 343/181 |
| 3,108,158 | 10/1963 | Jones | 325/63 |
| 3,829,778 | 8/1974 | Amoroso | 325/17 |

Primary Examiner—Albert J. Mayer
Attorney, Agent, or Firm—M. P. Williams

[57] ABSTRACT

A transceiver, adapted for use as either a master or a slave in a duplex pair, has a single, voltage-tunable, solid-state oscillator to provide the carrier frequency wave, a small portion of which is mixed with the received wave and applied therewith to a single ended mixer; an automatic gain-controlled loop cancels transmitter input modulation from the receiver output. The desired oscillator carrier frequency of the master transceiver is locked to a frequency within the pass band of an RF filter at the receiver input and separated from the center frequency of the filter by one-half the receiver IF frequency. The slave transceiver is first locked to a frequency within the pass band of the filter on the opposite side of its center frequency and separated therefrom by one-half the IF frequency (the slave thus offset from the master by their common IF frequency). Thereafter, upon sensing output from its IF amplifier (from the master), the slave is switched to operate in response to AFC developed by the received signal, such that the master and slave transceivers are locked together at frequencies differing by their common IF frequency. The RF filter also limits the signals to which the receiver can respond. An integrating amplifier provides demodulator and AFC filtering and, together with a bistable device, initial sweeping of the oscillator control voltage in respective directions depending on being in the master mode or the slave mode. Internal auxiliary modulation provides for pretransmission transmitter modulation cancellation and frequency stability.

6 Claims, 3 Drawing Figures

FILTER STABILIZED SINGLE OSCILLATOR TRANSCEIVERS

CROSS REFERENCE TO RELATED APPLICATIONS

This invention is an improvement on and employs some of the claimed features of my commonly owned copending basic application Ser. No. 501,721 filed on Aug. 29, 1974 and entitled SINGLE OSCILLATOR MICROWAVE TRANSCEIVER, a continuation of Ser. No. 337,609, filed on Mar. 2, 1973, now abandoned. The subject matter and disclosure herein is in part similar to that of my commonly owned copending application Ser. No. 501,727, filed on Aug. 29, 1974, and entitled FREQUENCY STABILIZED SINGLE OSCILLATOR TRANSCEIVER.

BACKGROUND OF THE INVENTION

1. Field of Invention

This invention relates to transceivers, and more particularly to identical transceivers adapted for one in a slave mode to lock onto a frequency offset from the frequency of a related transceiver in a master mode by their common IF frequency.

2. Description of the Prior Art

A recent innovation in communications has been the utilization of microwave transceivers for line-of-sight transmission, typically as an alternative to hardwired connections between transmitting and receiving units. The apparatus may be utilized at extremely high frequencies, with carriers in the millimeter wave bands, thus providing them with a rather directional transmission characteristic which renders them useful in providing relatively secure transmission as well as avoiding interference with adjacent units in crowded areas (such as in building-to-building installations in cities).

In order to maximize utilization of such units, the cost thereof has been minimized in some cases by employing single oscillator designs in which a portion of the transmitter oscillator energy is coupled to the receiver as a substitute for a local oscillator to provide the beat frequency for generating the IF. In my aforementioned basic application, the use of a single solid state oscillator necessitates cancellation of the transmitter input modulation from the receiver output, particularly in the case of transmission and reception of data where any amount of crosstalk is intolerable. This is accomplished therein by controlling the gain of the transmitter input modulation amplifier in such a fashion as to null the transmitter input modulation from the receiver output on a closed-loop, AGC basis. However, the gains in the circuit are not properly adjusted until some time after transmitter input modulation is received.

Furthermore, depending upon the characteristics of the solid state oscillator in use, it may have insufficient open loop stability to meet FCC carrier frequency stability requirements. Such devices also frequently have an extremely wide tuning range. The frequency of oscillation of the voltage tunable solid state oscillator may readily be stabilized by means of a feedback loop including a resonant device together with means for initially sweeping the tuning voltage until the oscillator can lock onto the resonant frequency. In my aforementioned similar application, the frequency is stabilized by means of a resonant cavity feeding a synchronous demodulator, the transmitter input modulation being applied to the oscillator appears as sidebands in the wave passed through the cavity, which sidebands provide polarity or sense to the correction voltage such that it nulls the oscillator to the desired frequency as indicated by the cavity. However, in this case also, the stabilizing of oscillator operation at a desired frequency with respect to the resonant cavity cannot be established until transmitter input modulation is applied to the transceiver. In the case of covert operation, it is of course desirable to have both the frequency of oscillation and the closed loop AGC gain (for cancellation of unwanted receiver modulation) fully stabilized before it is desired to transmit.

In the case of matched transceivers which are designed for duplex operation, there are additional problems with the slave transceiver, which is typically locked (by AFC) to a frequency separated from the master transceiver frequency by the IF frequency of both transceivers, such that the slave receiver operates on the upper sideband of the master transmitter frequency while the master receiver operates on the lower sideband of the slave transmitter (or vice versa). The slave transceiver must have its oscillator swept in frequency until it can lock onto an AFC signal generated in its receivers, as a result of reception of a signal having a frequency separated from the master transmitter by the IF frequency. However, the sweeping of the input voltage which controls the frequency of a slave oscillator can cause it to lock onto other transceivers operating at extremely divergent frequencies, rather than to the master transceiver with which it is designed to operate as a pair. Even with limited voltage ranges custom designed for individual oscillators, the slave may lock onto the opposite sideband of a transceiver operating at a frequency separated by substantially twice the IF frequency of the pair. As a distinct problem, any receiver can respond to the joint transmissions of any two other transmitters operating in the same area and separated in frequency by an amount nearly the same as the IF frequency of the receiver, even if it doesn't lock on to either of them.

SUMMARY OF INVENTION

Objects of the present invention include provision of improved transceivers with increased probability that a slave transceiver will lock onto the frequency of a related master transceiver, reduced likelihood of any receiver responding to unwanted inputs from other proximate transmitters, and stabilized quiescent operation.

According to the present invention, a transceiver employinig a voltage-tunable oscillator includes a bandpass RF filter at the receiver input, the output of the receiver mixer being used to generate a frequency control voltage which tunes the oscillator to a frequency separated from the center frequency of the RF filter by one-half of the IF frequency of the transceiver. When in a master mode, the transceiver remains locked to the frequency thus established; when in a slave mode, the transceiver will shift to AFC operation once the receiver has received a sufficiently strong signal (from a related transceiver operating in a master mode) to generate a substantial AFC voltage. According further to the invention, the RF filter at the receiver input limits the signals to which the receiver can respond to not only those separated by the IF frequency of the receiver, but those whose absolute RF frequencies are within the bandpass of the filter, thereby mitigating the opportunity to receive false signals from other transmitters and the opportunity for the slave transceiver to lock onto a frequency other than a related transceiver with which it is working in a duplex pair.

In accordance further with the present invention, auxiliary internal modulation is provided to permit utilizing a modulation frequency stability loop and modulation-responsive closed loop AGC cancellation of unwanted transmitted modulation in the receiver output while in a quiescent state.

The present invention is implementable in a wide range of configurations utilizing technology and components which are readily available in the art. The invention avoids the necessity of transmitting prior to the stabilization of oscillator frequency and prior to stabilization of closed loop AGC gain control over unwanted transmitter modulation in the receiver.

The invention, by using an RF filter at the receiver input, severely limits the opportunity for interference from other transmitters operating close by, and by means of a stability loop dependent upon the receiver mixer output, achieves the aforementioned advantage from the same resonant device as provides frequency stability to the transmitter when in a master mode, and for slave mode start-up.

Other objects, features and advantages of the present invention will become more apparent in the light of the following detailed description of preferred embodiments thereof, as illustrated in the accompanying drawing.

DESCRIPTION OF THE PREFERRED EMBODIMENT

An exemplary embodiment of the present invention is illustrated in a fashion which is commensurate with the illustrations in my aforementioned applications, and elements herein which are the same as or similar to corresponding elements of my aforementioned basic application are identified with the same reference numerals. Description of the inventive portions follows presentation of the underlying embodiment.

Figure 1:
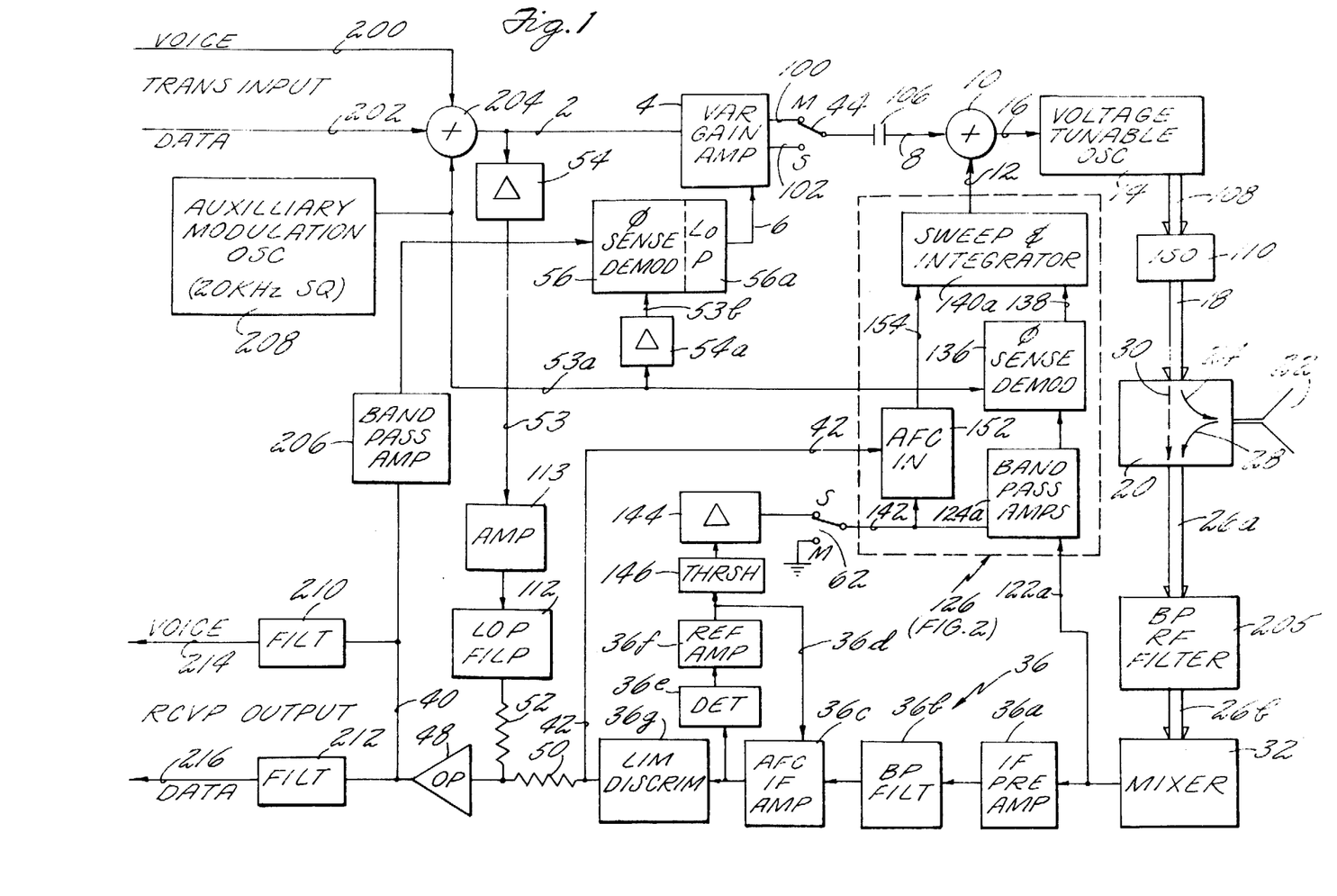
FIG. 1 is a block diagram of a preferred embodiment of the present invention.

In FIG. 1, information to be transmitted by the transceiver, which may comprise either voice or other analog signals on a line 200 or digital data signals on a line 202 combined in a summing device 204, is applied to a transmitter input line 2 and is referred to hereinafter as transmitter input modulation. These signals may be provided by limiters or AGC controlled amplifiers (not shown) so that the amplitude excursion is carefully regulated, if desired, in order to limit the FM excursion of transmissions, as described hereinafter. The modulation on the line 2 is applied to a variable gain amplifier 4, the gain of which is controlled by an AGC signal on a line 6 in a manner which is described more fully hereinafter. The amplifier 4 has a pair of bipolar outputs 100, 102 which are referred to herein as + and − in an arbitrary fashion simply for reference purposes, the significance simply being that they are opposite and by virtue of the positioning of a related switch 44 into either a master (M) or slave (S) position, can bear a known relationship to the polarity and/or phase of other signals, as described hereinafter. From the switch 44, the amplifier output is AC coupled, such as through a capacitor 106 and over a line 8 to a summing device 10, to be added to a DC carrier frequency control voltage on a line 12 so as to provide a frequency control voltage to a voltage-tunable oscillator 14 (such as a varactor tuned Gunn oscillator) over a line 16.

Output coupled from the oscillator 14 is provided over a waveguide or other suitable transmission line 108 to an isolator 110 and over a waveguide 18 to an orthomode transducer 20. The isolator 110 prevents reflected waves which may be generated in the waveguide 18, as a result of impedance mismatching, from feeding back to the oscillator 14 and causing frequency variations therein. The isolator 110 may comprise a well known circulator in which only two ports are utilized, and any additional ports are provided with a lossy termination. The orthomode transducer couples the transmitted wave from the oscillator 14 to an antenna means 22, as indicated by the arrow 24. The orthomode transducer 20 also couples waves received by the antenna means 22 to a waveguide 26a as indicated by an arrow 28. A small amount of the transmitter wave from the oscillator 14 is also coupled to the waveguide 26a as indicated by the broken arrow 30. This portion of the transmitter wave is used to mix with the received wave in the waveguide 26a, a resonant means such as a bandpass RF filter 205 and a waveguide 16b so as to provide a beat frequency in a single ended mixer 32 such that the output thereof, on a suitable transmission line 34 (which may preferably comprise coaxial cable) will be at the IF frequency of a receiver 36.

The receiver 36 typically includes a matching preamplifier 36a designed to interface properly with the output of the single ended mixer, followed by a bandpass filter 36b, for noise rejection, and an AGC IF amplifier 36c, having its gain controlled by another AGC signal on a line 36d. The AGC signal is developed by a detector 36e feeding a differential amplifier 36f which has a reference for comparison with the detector output, in conventional fashion. The gain-controlled output of the amplifier 36c feeds a limiter/discriminator stage 36g which consists of a suitable number of amplitude-limiting IF amplifier stages followed by an FM discriminator which supplies the desired audio or video output. However, the output of the receiver 36 contains not only the audio or video relating to the modulation on the carrier wave received at the antenna 22 from a similar, remote transceiver, but also includes the modulation of the transmitter wave from the oscillator 14 in this transceiver, which is leaked through the orthomode transducer 20 to serve as a local oscillator signal. The transmitter modulation must be cancelled from the receiver output in order to provide a receiver output signal on a line 40 which is a faithful reproduction of the signal received at the antenna 22 from the remote transmitter.

IN order to achieve transmitter modulation cancellation, the output of the receiver 36 is applied over a line 42 through a resistor 50 to a junction with another resistor 52 for application to the input of an operational amplifier 48. The resistor 52 receives signals from a low pass filter 112 which provides the same pulse shaping characteristics to signals passed by an amplifier 113 from a line 53 as the bandpass filter 36b provides to the modulation passing through the receiver 36. This is not necessary in the case of low frequency analog modulation or low data rates of digital modulation, but as data rates increase, and bit times decrease, for maximum cancellation characteristics, an approximate equalization of pulse shapes is required, and therefore the matching of the transmitter input modulation applied by the low pass filter 112 with that applied by the receiver 36 becomes more and more critical.

The signal on the line 53 is provided by a delay unit 54 which is in turn responsive to the transmitter input modulation signal on the line 2. The delay period of the delay unit 54 is set to equal circuit propagation time from the line 2, through the variable gain amplifier 4, the osciallator 14, the transducer 20, the mixer 32 and the receiver 36 so that the phase of the modulation as it passes through the resistor 50 to the input of the amplifier 48 will be exactly opposite to the phase of the signals applied through the resistor 52 to the input of the amplifier 48. This causes cancellation of the transmitter input modulation, providing only that the amplitudes are the same. In order to provide equal amplitudes, the output of the amplifier 48 is applied through a bandpass amplifier 206 to the signal input of a phase sensitive demodulator (or synchronous demodulator) 56 which provides synchronous full wave rectification of the output of the amplifier 48. The rectification is in phase with a reference signal on a line 53b delayed in a delay unit 54a (by the same delay as the unit 54) from a reference signal on a line 53a from an auxiliary modulation osciallator 208 which also provides a signal to the summing device 204. The auxiliary modulation oscillator 208 provides, during all modes and conditions of operation, a low level signal for modulating the oscillator 14 in order to permit stabilizing the frequency of the oscillator 14 (as described hereinafter) and stabilizing cancellation of transmitter input modulation in the receiver without any input modulation being present on the lines 200, 202.

This is an important aspect of the invention. Any auxiliary modulation remaining in the output of the receiver 48 will cause a time varying DC signal to pass, after smoothing by a low pass filter 56a, to the gain control input of the amplifier 4 over the AGC line 6. This, in turn, adjusts the gain of modulation provided to the oscillator 14 either upwardly or downwardly in such a fashion that the auxiliary modulation is totally cancelled at the output of the amplifier 48. Since the transmitter input modulation and the auxiliary modualtion affect the loop in the same fashion, the transmitter input modulation is also cancelled. The delay units 54, 54a may be tapped or continuously variable delay units if desired, so as to permit precise adjustment thereof, particularly at high data rates. However, for analog or low rate digital modulation, the delay usually can be readily determined for one unit and fixed delay units of an appropriate characteristic may thereafter be utilized; and the delay unit 54a can also be eliminated in some cases. Provision of the amplifier 113 between the low pass filter 112 and the delay unit 54 provides a rough adjustment of the level of the cancellation signal through the resistor 52 in contrast with the desired magnitude of the reference signal on a line 53 and the desired ratio of modulation voltage to DC control voltage in the oscillator 14, for a proper frequency excursion in the FM transmission. On the other hand, the cancellation function of the amplifier 113 may be achieved by suitable adjustment of the values of the input resistors 50, 52, although this could cause discrepancies in the cancellation at other than nearly a null. Provision of automatic gain control to the amplifier 4 in response to nulling of auxiliary modulation at the output of the operational amplifier 48 thereby provides for closed loop, complete cancellation of transmitter input modulation from the receiver output signal on the line 40. It also provides closed-loop control over the oscillator frequency excursion, to the same degree as the amplitude of the transmitter input modulation on line 2 (such as by AGC or limiter circuits, not shown) and the scale factor of the discriminator are maintained.

The receiver output on the line 40 may be passed through respective filters 210, 212 so as to provide separate signals on a voice output line 214 and on a data output line 216. Except for these filters, the separate voice and data inputs 200, 202, the auxiliary modulation oscillator 208, the bandpass amplifier 206, and the bandpass RF filter 205, the underlying embodiment described thus far is the same as that described in may aforementioned similar application, and is based on the principles of my aforementioned basic application.

Another aspect of the present invention is the manner in which closed loop frequency stability is provided for the oscillator 14. The output of the mixer 32 provides a detected, A.M. signal on a line 122a which has zero amplitude when the carrier frequency $f_o$ of the oscillator 14 is adjusted to the peak of the gain curve of the filter (at and near its resonant frequency, $f_c$), and has amplitude proportional to the amount by which $f_o$ differs from $f_c$ with polarity dependent upon whether the oscillator is turned below the peak of the cavity or above the peak of the cavity. This is applied to a bandpass video amplifier 124a, which is a portion of a frequency control circuit 126. The output of the amplifier 124a is applied on a line 134 to the signal input of a phase sensitive demodulator 136. The reference input to the phase sensitive demodulator 136 comprises the reference signal on the line 53a. As is known, if there is modulation on the RF signal (as is true in the present case), the phase sensitive demodulation of the mixer output will provide a frequency dependent signal on a line 138 with amplitude proportional to the amount by which the oscillator frequency varies from the frequency of the tuning cavity 116, and with polarity indicative of the sense of the frequency error. Such a frequency modulation stabilizer is described in Section 19.2.2 of Harvey, A. F., *MICROWAVE ENGINEERING*, Academic Press: New York and London, 1963. This signal is smoothed in a sweep and integrator circuit 140a (the details of which are discussed hereinafter with respect to FIG. 2) for application as the DC carrier frequency controlling voltage on the line 12.

A master/slave switch 62 is provided so that the video amplifier 124a can be rendered ineffective by a signal on a line 142 when the transceiver is operating in a slave mode, but not when in the master mode. When it is desired to operate in the slave mode, the signal on the line 142 enables operating in response to an AFC error signal on the line 42, and also serves to disable the video amplifier 124a. The switch 62 is fed by the output of a delay unit 144 which may provide any suitably long delay, such as several seconds, which in turn responds to a threshold detector 146 that senses the level of the AGC signal on the line 36d The AGC signal is proportional to the level of signal passed to the IF amplifier 36c by the bandpass filter 36b. The threshold detector 146 may comprise a Schmidt trigger or the like, and the delay circuit 144 may comprise a Schmidt trigger with an integrator at its input, to delay toggling. When the delay circuit toggles, it indicates that the receiver 36 is (and has been, during the delay) receiving a significant signal from a related, remotely-located transmitter so that the oscillator 14 of this transceiver (operating in a slave mode) may be locked to the remote transmitter offset therefrom by the IF frequency of the receiver 36, such that the oscillator 14 acts as the local oscillator to produce the IF frequency in the single ended mixer 32. This also causes the transmission of this transceiver to be offset from the oscillator of the remote transceiver by its IF frequency, since they have the same design IF. The delay circuit 144 is provided in order to avoid response to noise, other unrelated transceivers, or other spurious signals. When there is an output from the delay circuit 144 and the switch 62 is in the slave position as shown in FIG. 1, a signal on the line 142 will enable an AFC input circuit 152 to provide the AFC signal from the AFC circuit 42 to a line 154 for filtering in the sweep and integrator circuit 140a and application as the carrier frequency controlling DC voltage on the line 12.

Figure 2:
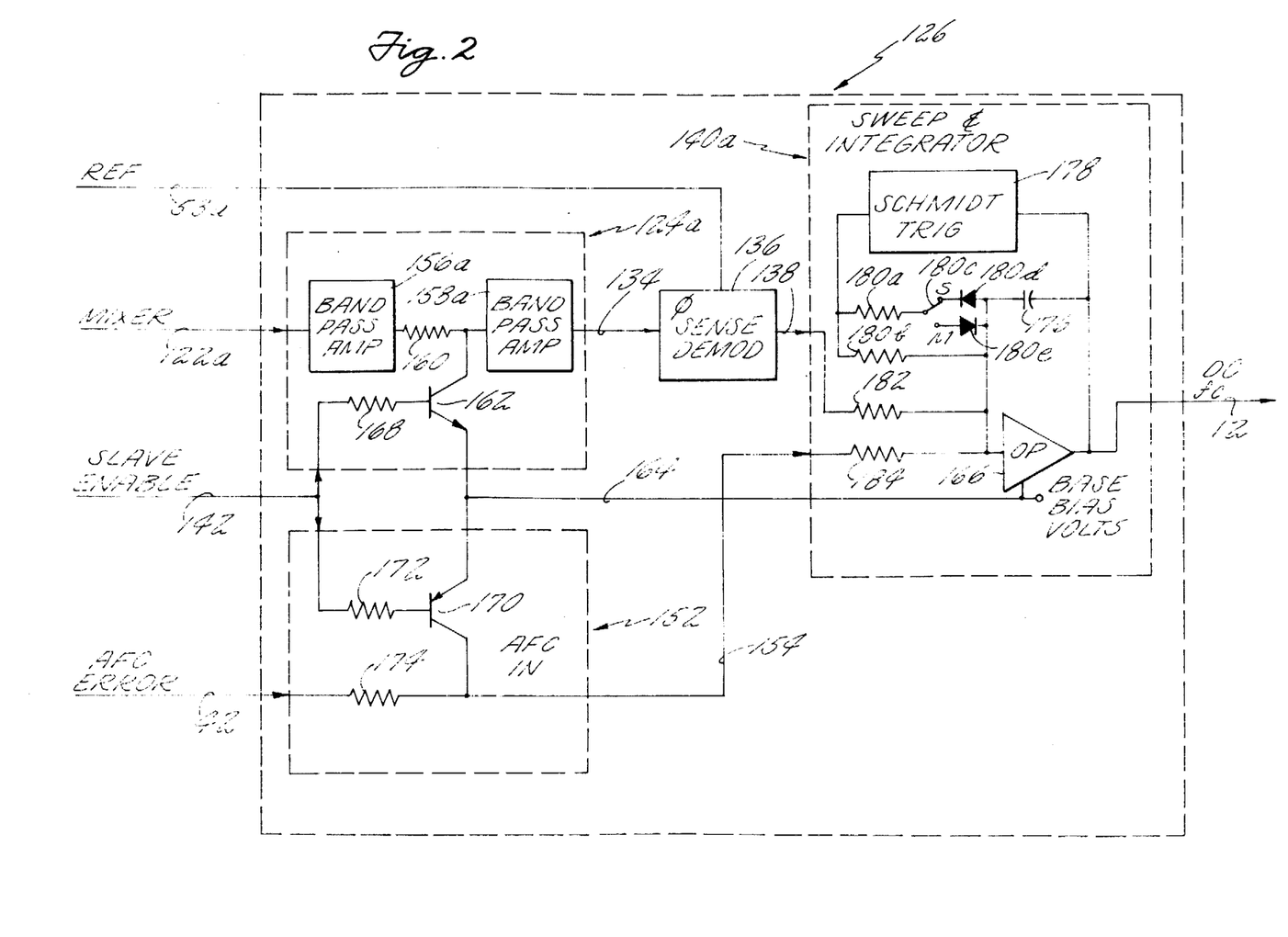
FIG. 2 is a schematic block diagram of frequency control apparatus included in the transceiver embodiment of FIG. 1.

Referring now to FIG. 2, the frequency control circuitry 126 is shown in the same fashion as in FIG. 1 except that additional detail is shown with respect to the video amplifier 124, the sweep and integrator circuit 140a, and the AFC input control circuit 152.

The video amplifier 124a (FIG. 2) comprises a pair of bandpass video amplifier stages 156a, 158a connected by a resistor 160. The input to the amplifier 158a is connected through an NPN transistor 162 to a line 164 at a suitable reference potential. The reference potential on the line 164 may be ground in some circumstances, or may be base bias voltage of an operational amplifier 166 within the sweep and integrator circuitry 140a, as is described more fully hereinafter. The transistor 162 is connected through a resistor 168 to the line 142 such that when the slave enable AFC signal appears on the line 142, the transistor 162 operates, pulling the input of the amplifier 158a down, thereby reducing its gain to a point where its output is no longer significant in the sweep and integrator circuit 140a, as is described more fully hereinafter.

The AFC input control circuit 152 similarly comprises a PNP transistor 170 which is connected through a resistor 172 to the slave enable AFC line 142. The transistor 170 normally conducts so as to cause the AFC input line 154 to be brought to the reference potential of the line 164, so as to render the AFC signal ineffective in the sweep and integrator circuitry 140a as described hereinafter. When the signal appears on the line 142, it causes cut-off of the transistor 170 so that the AFC signal is applied to the amplifier 166. The AFC input circuitry 152 also includes a buffer resistor 174 to buffer the AFC error signal on the AFC circuit 42 from the reference potential on the line 164 when the transistor 170 is conducting.

The sweep and integrator circuitry 140a comprises the operational amplifier 166, which is connected in an inverting configuration, and a feedback capacitor 176 which together comprise an active integrator, or integrating amplifier, in the well known fashion. The output of the amplifier 166 is also connected to the input of a suitable bistable device, such as a Schmidt trigger 178, an output of which is in turn connected to a pair of input resistors 180a, 180b which together with a pair of other resistors 182, 184, comprise a summing amplifier input summing junction. As is known, the Schmidt trigger output will vary between an upper voltage level and a lower voltage level. Assuming there are no inputs on either of the resistors 182, 184 at any moment in time, the Schmidt trigger will be at one or the other voltage level, which is applied through the resistors 180a, 180b to the integrating amplifier 166. This causes the output to either increase or decrease, substantially linearly if the time constant represented by the resistors 180a, 180b and the capacitor 176 is sufficiently large, until the output of the operational amplifier 166 reaches the opposite threshold voltage to toggle the Schmidt trigger 178. When the trigger 178 toggles, the opposite voltage of its output will be passed through the resistors 180a, 180b to the input of the integrating amplifier 166, causing it to commence integration in the opposite direction. The resistor 180a is made to be quite small in contrast with the resistor 180b (on the order of ten times smaller or more) such that a negative output of the Schmidt trigger will forward bias a diode 180d thereby effectively shunting the resistor 180b. Thus, negative inputs to the amplifier 166 will be quite large (illustration (a), FIG. 3) and cause a significantly smaller time constant for the integration such that the output of the amplifier 166 in response thereto is a rapidly rising voltage as shown at the left side of illustration (b) of FIG. 3. However, with the switch 180c remaining in the position shown, when the Schmidt trigger output goes positive, the diode 180d is reversed biased so that the resistor 180a is not in the circuit; thus, with the switch 180c as shown the Schmidt trigger output when positive must pass through the resistor 180b which is much larger, thereby providing a smaller effective input to the operational amplifier 166 and a larger time constant so that the output of the amplifier 166 is a very slow decay as shown in illustration (b) of FIG. 3, and the output of the integrating amplifier 166 will be substantially a sawtooth. In fact, the value of the resistor 180a can be chosen in conjunction with the capacitance of the capacitor 176 so as to cause the positive swing to be so rapid that there is no opportunity for a frequency lock-on during the positive sweep of the output voltage of the amplifier 166. With the switch 180c reversed so as to be in the master position, the converse is true; that is, the negative swings will be too rapid to lock onto, but the positive rises will be slow and gentle (just the inverse, in the sense of polarity, from illustration (b) of FIG. 3). The provision of the time varying voltage on the line 12 will cause commensurate slewing of the frequency of the oscillator 14 (FIG. 1) so that by the end of a full cycle of slewing in response to the sawtooth, the oscillator 14 will at some point be tuned to a frequency within the pass band of the RF filter 205 (illustration (c), FIG. 3) so that there will be a significant output from the mixer 32 (illustration (d), FIG. 3) applied on the line 122a to the bandpass amplifier 124a (FIG. 2). Assuming that the slave enable AFC signal is not present on the line 142, the transistor 162 will not be conducting, so that the full output of the amplifier stage 156a will be provided to the input of the amplifier stage 158a, and over the line 134 to the signal input of the phase sensitive demodulator 136, thereby to provide a signal to the resistor 182 which indicates, by its amplitude and polarity, the magnitude and sense of the error of the oscillator center frequency with respect to the tuning cavity resonant frequency. This will occur at a time when the Schmidt trigger has a positive output (illustration (a), FIG. 3), and the voltage applied by the phase sensitive demodulator 136 through the resistor 182 (illustration (c), FIG. 3) will be added (illustration (e)), to the voltage then being provided by the Schmidt trigger 178 through the resistor 180b in a proportion related to the ratio of the resistors 180b, 182. By causing the resistor 180b to be properly related to the resistance of the resistor 182, the proportion of the input signal relating to the phase sensitive demodulator 136 can be on the same order of magnitude as that relating to the Schmidt trigger 178. This causes the input to the operational amplifier 166 to be near a null with an output on the line 12 which tunes the oscillator 14 (FIG. 1) to a frequency separated by one half the IF frequency from the center frequency of the RF filter 205 (illustration (c), FIG. 3) and since this is in a closed loop, any tendency of the Schmidt trigger 178 input to integrate through the amplifier 166 and to cause the oscillator frequency to deviate from the desired frequency will be nulled by the closed loop operation through the phase sensitive demodulator 136. Thus, the output of the integrating amplifier 166 on the line 12 will quickly stabilize at a voltage which causes the oscillator 14 to assume a frequency in the pass band of the RF filter and off center by half the IF frequency.

Figure 3:
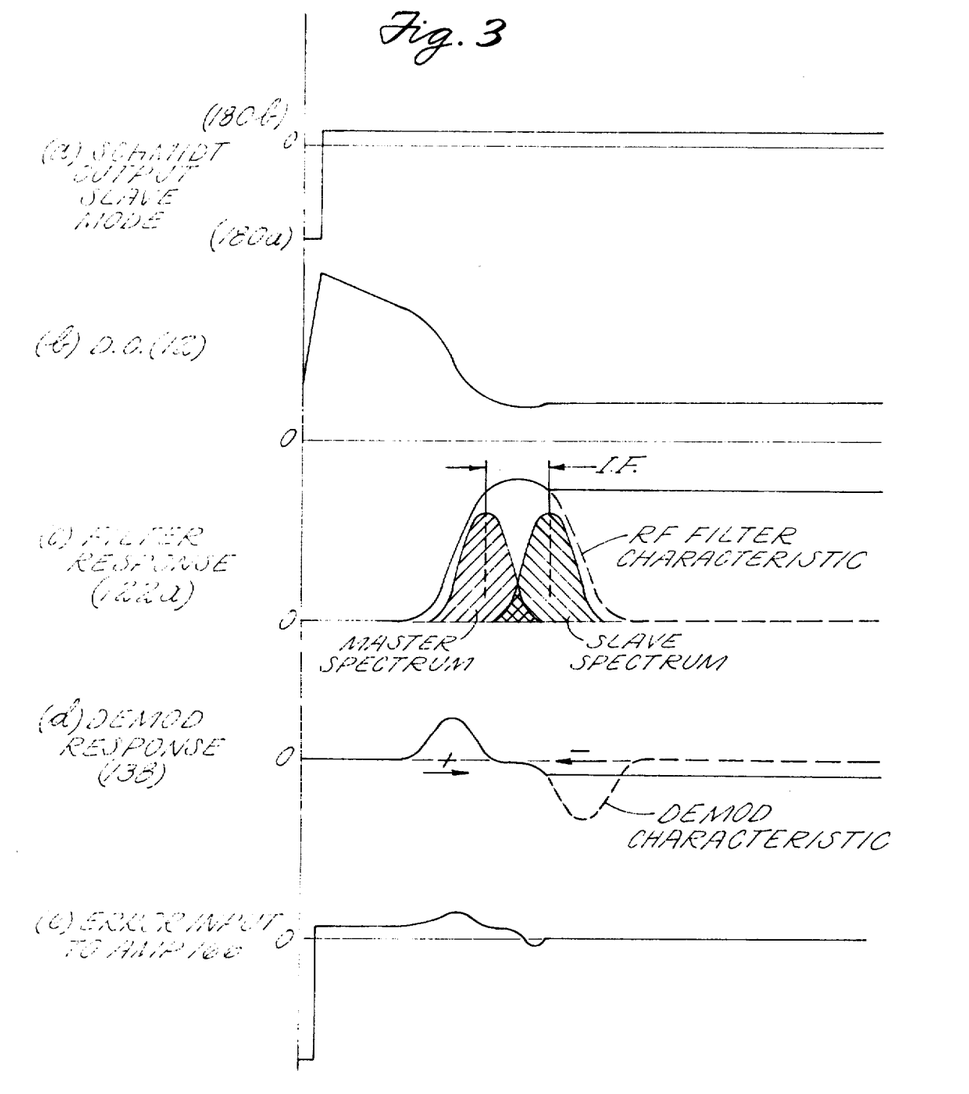
FIG. 3 is an illustration of operating characteristics of the embodiment of FIG. 1.

The operation of the frequency control circuit 126 (sweeping until the oscillator is locked to the filter frequency) is further illustrated with respect to FIG. 3. At any arbitrary point in time, the Schmidt trigger may have been providing a negative output so that the DC frequency controlling voltage on the line 12 is integrating positively (due to the inversion of the amplifier 166). When it reaches the input threshold of the Schmidt trigger, the trigger will toggle, thus providing a positive output to the resistor 180, as seen in illustration (a), FIG. 3. This will cause the output of the amplifier 166 to begin integrating in a negative direction as shown in illustration (b) of FIG. 3. At some point in time, the DC voltage on the line 12 is such as to cause the oscillator frequency to be within the response characteristic (illustration (c)) of the RF filter, and therefore also within the output characteristic of the phase sensitive demodulator (illustration (d)). Thus, the phase sensitive demodulator 136 starts to have an output as shown in illustration (d). This is added with the output of the Schmidt trigger (illustration (a)), so as to provide an increase in the error voltage input to the amplifier 166 (illustration (e)), which in turn causes the DC output on line 12 (illustration (b)) to begin integrating negatively in a more rapid fashion. Then, after the peak of the demodulator response, the integrator continues to integrate in a negative fashion at a less rapid rate until the demodulator response reaches zero at about the center frequency ($f_c$) of the cavity characteristic; integration will then become positive due to the negative input of the demodulator response characteristic (illustration (d)) and therefore the demodulator output (illustration (d)); when this has reached a point that just offsets the Schmidt input, the input to the integrator becomes zero and the output of the integrator on the line 12 (illustration (b)) will remain constant, such that the oscillator is tuned to a frequency in the center of the desired slave spectrum, offset from the center frequency of the RF filter by half the IF frequency. The amount of this offset is determined by the open loop gain of the operational amplifier 166 which can be extremely high (on the order of thousands) and a commensurate adjustment between the value of the resistors 180b, 182, all in a known fashion.

Notice that the polarities are such that, regardless of whether the voltage on the line 12 is increasing (master) or decreasing (slave), it will approach the voltage required to tune the oscillator to a desired frequency with the demodulator output aiding the sweep voltage and driving the cavity toward zero until it has passed the center frequency of the cavity. If, for some reason, a noise input causes a sufficient input to the integrator to drive the oscillator off of resonance, it will automatically be returned to resonance due to this polarity relationship. The difference in the input voltage to the amplifier 166 relating to the Schmidt output and that relating to the demodulator output may be much greater than would appear from the illustrations of FIG. 3.

The sense of the output of the video amplifier 124 is chosen to be correct with respect to the sense of the transmitter modulation as determined by the switch 44 since it is necessary that the demodulated signal on the line 138 has a correct sense to null the difference between the frequencies of the oscillator 14 and the desired frequency.

When in the master mode, the switch 180c is reversed so the oscillator is swept in the opposite direction approaching the desired lower-offset frequency within the bandpass of the RF filter 205 from the high end, locking to the negative response of the demodulator. The operation just described (consisting of slewing the oscillator until the desired frequency is reached, after which closed loop control through the RF filter and the phase sensitive demodulator balances the effect of the sweep circuit, and the oscillator becomes locked to the desired frequency) is used whether the transceiver unit is switched for operation in the slave mode or in the master mode. When in the master mode, this stabilized operation continues indefinitely, and the AFC input through the resistor 184 is not permitted since the transistor 170 conducts and causes the AFC input line 154 to be at the reference potential of the line 164 (which as illustrated herein is taken to be the base bias voltage potential of the amplifier 166) such that there is substantially no current through the resistor 184 and it has no effect on the output of the operational amplifier 166.

However, when the transceiver unit has its switches in the positions shown in FIGS. 1 and 2 to cause operation in the slave mode, not only does the foregoing operation of sweeping and locking on to the desired frequency occur, but thereafter an additional function is provided by means of the slave enable AFC signal on the line 142 which will become present when the transceiver starts to receive significant transmissions from a related, remotely-located transceiver operating in the master mode. Because the RF filter 205 (FIG. 1) in one transceiver of a duplex pair is adjusted to have the same center frequency and passband as the RF filter in the other transceiver in the same duplex pair, the one of the transceivers which is operating in the slave mode can first lock its oscillator to the upper offset frequency of its own RF filter, which should be exactly the same as the frequency required of its oscillator in order that the portion of the oscillator energy leaked through the orthomode transducer to the single ended mixer will cause a beat frequency at the IF frequency. In other words, once the slave receiver is locked to its own RF filter, it may then transfer to AFC operation so that it will precisely track the frequency of the related transceiver, with practically no chance of jumping to another frequency at which some other transceiver is operating. This is achieved in the present case by preventing the slave transceiver from operating in response to AFC until at least several seconds after the device is in operation and a signal has been sensed through its own receiver, indicating that it is getting transmissions from its related transceiver and that its oscillator is tuned to approximately the correct frequency as determined by its RF filter and the sweep and integrator circuit 140a. When this happens, the delay unit 144 provides, through the switch 62, the slave enable AFC signal on the line 142 which removes the shunt effect of the transistor 170 (FIG. 2) thereby allowing AFC input to the integrating amplifier 166 while at the same time it shunts out the input of the RF filter loop by means of the transistor 162 (FIG. 2). Thus, AFC operation cannot result from other than an IF signal derived from mixing a received wave with the leakage from the oscillator 14 after the slave oscillator has locked on to the correct offset frequency within the pass band of the RF filter 205, since any IF signals spuriously received while the oscillator is tuning will be ignored due to the delay unit 144.

This is a significant aspect of the present invention since it nearly guarantees that the oscillator of a slave transceiver will lock onto only the correct transceiver which is assigned thereto in a duplex pair, by having the same RF filter and offset frequencies adjusted to be separated by the design IF frequency of both units. It is immaterial whether the master oscillator frequency is higher or lower than the slave oscillator frequency since either can operate on either the upper or the lower sideband. What is desired, however, is that both transceivers will be able to cancel modulation at the operational amplifier 48 (FIG. 1) by providing a correct polarity of discriminator output, which in turn is achieved by relating the polarity of the output of the variable gain amplifier 4 to the fact that the slave is higher or lower than the master in its assigned carrier frequency. If these happen to be reversed, then the signals on the resistors 50, 52 will add rather than subtract from one another since they will be of the same polarity. This is easily corrected by reversing the polarities of the output of the variable gain amplifier 4.

The relationship between the polarity at the output of the bandpass video amplifier 124a to the polarity of the output of the variable gain amplifier 4 is maintained by correct polarity of the master and slave positions of the switches 180c, 44 so that the output of the phase sensitive demodulator 136 will be of a sense that it will drive the frequency of the oscillator 14 in the manner described with respect to FIG. 3 hereinbefore, when in the slave mode (and oppositely when in the master mode).

An additional aspect of the present embodiment is that the integrating amplifier provided by the operational amplifier 166 and its feedback capacitor 176 automatically functions as a low pass filter to filter the output of the phase sensitive demodulator 136 and to filter the AFC output from the discriminator 36g, thereby avoiding the need for additional filter circuits.

The bandpass amplifiers 124a, 206 assure that the signals applied to the respective demodulators 136, 56 are limited to substantially only the auxiliary modulation, thereby to avoid error due to components of other modulation, and also prevent overdriving the demodulator inputs. The auxiliary modulation is of a relatively low level so its effect in a related transceiver can be ignored; choice of its frequency can be used to mitigate any interference with intelligence signals. Even though the slave cannot be AFC locked to the master prior to transmission, it will be set to the nominal correct frequency so that all transmissions can be perceived, and it will quickly lock on to the master. The reference input to the phase sensitive demodulators 56, 136 may be taken from the line 53 rather than from the line 53a; in such case, the delay is provided by the unit 54. However, it may be desirable to filter the reference signals at the frequency of the auxiliary modulation, thereby to significantly reduce input modulation from the reference signal so as to avoid overdriving the demodulators. Also, some delay may then be required in the stability loop (such as at the input or the output of the bandpass amplifiers 124a) since there is less propagation delay in this loop than through the receiver. Contrarywise, in the implementation of a transceiver as shown herein, some small delay may be desired at the reference input to the demodulator 136, but it is not necessary since any constant phase difference will only result in a very minor frequency offset which may be ignored and easily compensable in adjusting gains, scale factors and the like in the stability loop.

The exemplary embodiment disclosed herein is readily implemented with known technology utilizing components available in the market. The oscillator 14 may comprise a varactor tuned oscillator of a known type which includes a suitably biased Gunn-effect solid state device in a cavity which includes a varactor diode tuning loop controlled by the input voltage. One such device which is useful for carrier frequencies on the order of 40 GHz is sold under the designation VSQ-9021 by VARIAN, Palo Alto, Calif. On the other hand, as disclosed in my aforementioned basic application, it may instead comprise a voltage variable Gunn oscillator, comprising simply a Gunn device in which the bias is used for frequency control. The voltage/frequency characteristic — particularly polarity — may vary from that shown herein. Exemplary sources for the orthomode transducer, the single ended mixer, a suitable FM receiver, and the variable gain amplifier are given in my aforementioned basic application.

In place of the orthomode transducer 20, circulators which are readily available in the marketplace may be utilized. Similarly, the precepts of the present invention do not require the use of a single ended mixer, in which case a circulator without any controlled leakage may be used in place of the orthomode transducer and a separate waveguide feedpath provided to a balanced mixer from the output of the oscillator 14, in a way which is more nearly commensurate with the teachings of the prior art.

Similarly, the RF filter 205 may simply comprise a cylindrical waveguide resonant transmission cavity having a suitably low Q, the characteristics of which may include a center frequency on the order of tens of GHz, with half power points on the order of ±10 MHz from the center frequency to support a 20 MHz IF frequency, with waveguide input and output. Such devices are available off-the-shelf, such as model VA-1278 (17 GHz) from VARIAN, Palo Alto, Calif. The amplifiers, demodulators, threshold detector, delay circuits and other components are similarly well-known and available as off the shelf catalog offerings from a variety of sources.

Thus, although the invention has been shown and described with respect to a preferred embodiment thereof, it should be understood by those skilled in the art that the foregoing and various other changes, omissions and additions thereto may be made therein without departing from the spirit and the scope of the invention.

Having thus described a typical embodiment of my invention, that which I claim as new and desired to secure by Letters Patent of the United States is:

1. A transceiver, adapted for use in a duplex transceiver system including a pair of such transceivers settable for operation with one in a master mode and one in a slave mode, said transceiver comprising:

a single, voltage-tunable oscillator having means for providing a frequency-controlling voltage input thereto;

an FM receiver having the same IF frequency in the master mode as in the slave mode and including an RF mixer that drives said FM receiver and that provides a frequency-determining feedback signal;

antenna means for transmitting and receiving microwave energy;

an RF filter, having a center frequency and having a pass band greater than said IF frequency, the output of said RF filter coupled to said RF mixer;

means for coupling energy from said oscillator to said antenna means for transmission thereby and for simultaneously coupling energy received at said antenna means and a small portion of the energy of said oscillator to the input of said RF filter; and frequency control means including means providing an initial frequency sweep controlling voltage to the input of said oscillator to thereby sweep the frequency of said oscillator to a frequency within said band of frequencies, and having an input connected for response to the feedback signal output of said RF mixer, for providing a frequency control voltage to the frequency-controlling voltage input means of said oscillator in response to said feedback signal and to said initial frequency sweep controlling voltage to establish operation of said oscillator at a frequency separated from said center frequency by one half of said IF frequency, and further including means settable to designate said transceiver for operation in the master mode or the slave mode, and operable when set in the slave mode to provide said frequency control voltage to establish operation of said oscillator at one side of said center frequency and operable when set in the master mode to provide said frequency control voltage to establish operation of said oscillator at the other side of said center frequency.

2. A transceiver adapted for use in a duplex transceiver system including a pair of transceivers, said transceiver comprising:

a single, voltage-tunable microwave oscillator having means for providing a frequency-controlling voltage input thereto;

an FM receiver having a mixer with the same design IF frequency in both of such transceivers in the pair;

antenna means for transmitting and receiving microwave energy;

means for coupling energy from said oscillator to said antenna means for transmission thereby, and for simultaneously coupling energy received at said antenna means and a small portion of the energy of said oscillator to the input of said FM receiver;

input means for receiving transmitter input modulation and providing an input modulation signal;

auxiliary modulation means for providing internally-generated modulation;

combining means connected to said input means and to the output of said auxiliary modulation means for providing a combined modulation signal as the combination of said input modulation signal and said internally-generated modulation signal;

means responsive to said combining means for providing a modulation control signal to said frequency-controlling voltage input means for controlling the frequency of oscillation of said microwave oscillator in response to said combined modulation signal; and frequency modulation stabilizer means connected for response to the output of said FM receiver for controlling the oscillator with said auxiliary modulated oscillator signal for providing to said frequency-controlling voltage input means a closed loop frequency stability voltage.

3. A transceiver adapted for use in a duplex transceiver system including a pair of transceivers, said transceiver comprising:

a single, voltage-tunable microwave oscillator having means for providing a frequency-controlling voltage input thereto;

an FM receiver having a mixer with the same design IF frequency in both of such transceivers in the pair;

antenna means for transmitting and receiving microwave energy;

means for coupling energy from said oscillator to said antenna means for transmission thereby, and for simultaneously coupling energy received at said antenna means and a small portion of the energy of said oscillator to the input of said FM receiver;

input means for receiving transmitter input modulation and providing an input modulation signal;

auxiliary modulation means for providing internally-generated modulation;

combine means responsive to said auxiliary modulation means and to said input means for providing modulation signals to said frequency-controlling voltage input means as a function of said internally-generated modulation;

a resonant filter means connected for response to the output of said oscillator to provide a modulated signal having its phase dependent on whether the frequency of the output of said oscillator is above or below the resonant frequency of said resonant means and its amplitude dependent on the amount of difference therebetween, within a band of frequency differences; and frequency control means including a phase sensitive demodulator having its signal input connected for response to the output of said resonant means and its reference input connected to said auxiliary modulation means for providing to said frequency-controlling voltage input means a closed loop frequency stability voltage derived from said modulated signal.

4. In a transceiver, adapted for use in a duplex transceiver system including a pair of such transceivers settable for operation with one in a master mode and one in a slave mode, said transceiver comprising:

a single voltage-tunable microwave oscillator;
an FM receiver;
antenna means for transmitting and receiving microwave energy;
means for coupling energy from said oscillator to said antenna means for transmission thereby, and for simultaneously coupling energy received at said antenna means and a small portion of the energy of said oscillator to the input of said FM receiver;
transmitter input means for receiving a transmitter modulation signal and providing a modulation input signal;
auxiliary modulation means providing a low-level internal modulation signal;
control means including a combiner and a variable gain amplifier responsive to said transmitter input means and to said auxiliary modulation means for controlling the frequency of oscillation of said microwave oscillator in response to the sum of said input modulation signal and said internal modulation signal;
cancellation means responsive to the output of said FM receiver and to said auxiliary modulation means for cancelling similar modulation from the output of said FM receiver and for thereby providing a receiver output signal; and
gain control means responsive to said cancellation means for controlling the gain of said variable gain amplifier, in a manner to null the internal modulation in the receiver output signal to zero.

5. In a transceiver, adapted for use in a duplex transceiver system including a pair of such transceivers settable for operation with one in a master mode and one in a slave mode, said transceiver comprising:
a single microwave oscillator having frequency-controlling voltage input means;
an FM receiver;
antenna means for transmitting and receiving microwave energy;
means for coupling energy from said oscillator to said antenna means for transmission thereby, and for simultaneously coupling energy received at said antenna means and a small portion of the energy of said oscillator in mixed fashion to the input of said FM receiver;
transmitter input means for receiving a transmitter modulation signal and providing a modulation input signal;
auxiliary modulation means providing an internal modulation signal;
combining means connected to said input means and to the output of said auxiliary modulation means to provide a combined modulation signal as the combination of said input modulation signal and said internal modulation signal;
a variable gain amplifier having a signal input and a gain control input, said signal input being connected to said combining means, the output of said variable gain amplifier being connected to said frequency-controlling voltage input of said oscillator;
delay means responsive to said combining means for providing a delayed combined modulation signal which is delayed by a period of time substantially equal to the signal propagation time from the input of said variable gain amplifier through said FM receiver;
cancellation means responsive to the output of said FM receiver and to the output of said delay means for selectively combining said delayed combined modulation signal with the output of said FM receiver in voltage combining relationship to provide a receiver output signal having transmitter input modulation and internal modulation substantially cancelled therefrom; and
means responsive to the receiver output signal of said cancellation means and to said delayed internal modulation signal for providing a gain control signal to the gain control input of said variable gain amplifier, said gain control signal adjusting the gain of said variable gain amplifier so that the magnitude of internal modulation included in the output of said FM receiver is adjusted with respect to the magnitude of delayed internal modulation provided by said delay unit so that the combined modulation in said receiver output signal is substantially nulled to zero.

6. A transceiver adapted for use in a duplex transceiver system including a pair of transceivers, said transceiver comprising:
a single, voltage-tunable microwave oscillator having means for providing a frequency-controlling voltage input thereto;
an FM receiver having the same design IF frequency in both of such transceivers in a pair;
antenna means for transmitting and receiving microwave energy;
means for coupling energy from said oscillator to said antenna means for transmission thereby, and for simultaneously coupling energy received at said antenna means and a small portion of the energy of said oscillator to the input of said FM receiver;
input means for receiving transmitter input modulation and providing an input modulation signal;
auxiliary modulation means for providing internally-generated modulation;
combining means connected to said input means and to the output of said auxiliary modulation means for providing a combined modulation signal as the combination of said input modulation signal and said internally-generated modulation signal;
means including a variable gain amplifier responsive to said combining means for providing a modulation control signal to said frequency-controlling voltage input means for controlling the frequency of oscillation of said microwave oscillator in response to said combined modulation signal;
cancellation means responsive to the output of said FM receiver and to said combining means for cancelling similar modulation from the output of said FM receiver and for thereby providing a receiver output signal;
gain control means responsive to said cancellation means and to said auxiliary modulation means for controlling the gain of said variable gain amplifier in a manner to null the internal modulation in the receiver output signal to zero; and
frequency control means connected for response to the output of said oscillator and to said auxiliary modulation means for providing to said frequency-controlling voltage input means a closed loop frequency stability voltage.

\* \* \* \* \*